United States Patent [19]

Nelson

[11] Patent Number: 5,273,417
[45] Date of Patent: Dec. 28, 1993

[54] NOZZLE FOR GAS-ASSISTED INJECTION MOLDING

[75] Inventor: William A. Nelson, New Baltimore, Mich.

[73] Assignee: Automotive Plastic Technologies, Inc., Sterling Heights, Mich.

[21] Appl. No.: 850,124

[22] Filed: Mar. 12, 1992

[51] Int. Cl.⁵ .............................................. B29C 45/16
[52] U.S. Cl. ................................ 425/130; 264/572; 425/562; 425/563; 425/564; 425/812
[58] Field of Search ............... 425/130, 562, 563, 564, 425/812; 264/572

[56] References Cited

U.S. PATENT DOCUMENTS

| | | | |
|---|---|---|---|
| 4,101,617 | 7/1978 | Friederich | 264/93 |
| 4,106,887 | 8/1978 | Yasuike et al. | 425/549 |
| 4,474,717 | 10/1984 | Hendry | 425/812 |
| 4,685,881 | 8/1987 | Sasaki | 425/562 |
| 4,781,554 | 11/1988 | Hendry | 425/4 R |
| 4,824,732 | 4/1989 | Hendry et al. | 425/4 R |
| 4,905,901 | 3/1990 | Johnson | 239/135 |
| 4,935,191 | 6/1990 | Baxi | 264/572 |
| 4,942,006 | 7/1990 | Loren | 264/50 |
| 4,943,407 | 7/1990 | Hendry | 264/572 |
| 4,944,910 | 7/1990 | Hendry | 264/572 |
| 4,990,083 | 2/1991 | Bernhardt | 425/547 |
| 5,015,166 | 5/1991 | Baxi | 425/149 |
| 5,049,056 | 9/1991 | Baxi et al. | 425/130 |
| 5,054,689 | 10/1991 | Hunerberg et al. | 425/564 |
| 5,066,214 | 11/1991 | Baxi et al. | 425/190 |
| 5,080,570 | 1/1992 | Baxi et al. | 425/130 |
| 5,127,814 | 7/1992 | Johnson et al. | 264/572 |
| 5,149,546 | 9/1992 | Nelson | 425/562 |
| 5,162,122 | 11/1992 | Loren | 425/812 |
| 5,164,200 | 11/1992 | Johnson | 264/572 |

Primary Examiner—Tim Heitbrink
Attorney, Agent, or Firm—Howard & Howard

[57] ABSTRACT

An improved nozzle for gas-assisted injection molding and a method of gas-assisted injection molding using the improved nozzle are provided. This improved nozzle employs a very simple design to vent the gas from the mold cavity once the plastic article has cooled sufficiently to be self supporting. In one especially preferred embodiment of this invention, the improved nozzle contains a separate plastic shut-off valve, a separate gas inlet passage with a check valve, and a separate gas venting passage containing a movable pin. Venting of the pressurized gas occurs by movement of the movable pin so that the pressurized gas can burst through the thin layer of plastic material covering the gas venting passage. The improved nozzle design and method allow for almost continuous operation with minimal operator attention to the nozzle.

25 Claims, 4 Drawing Sheets

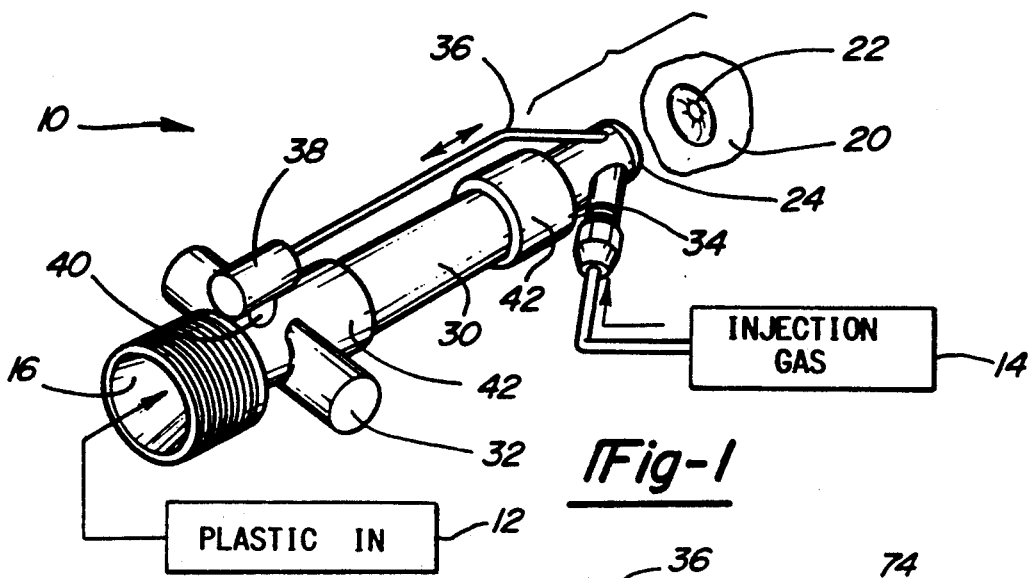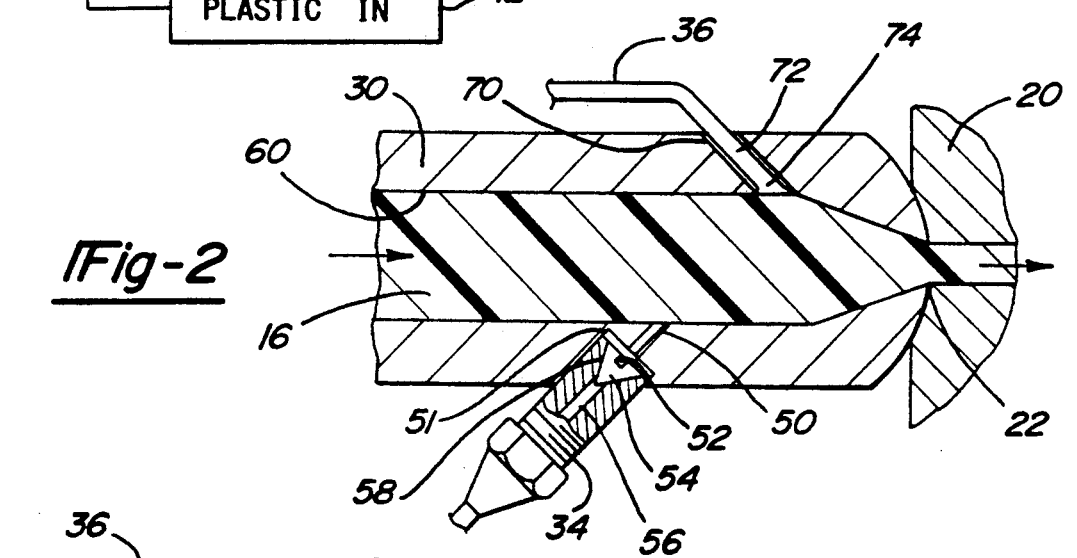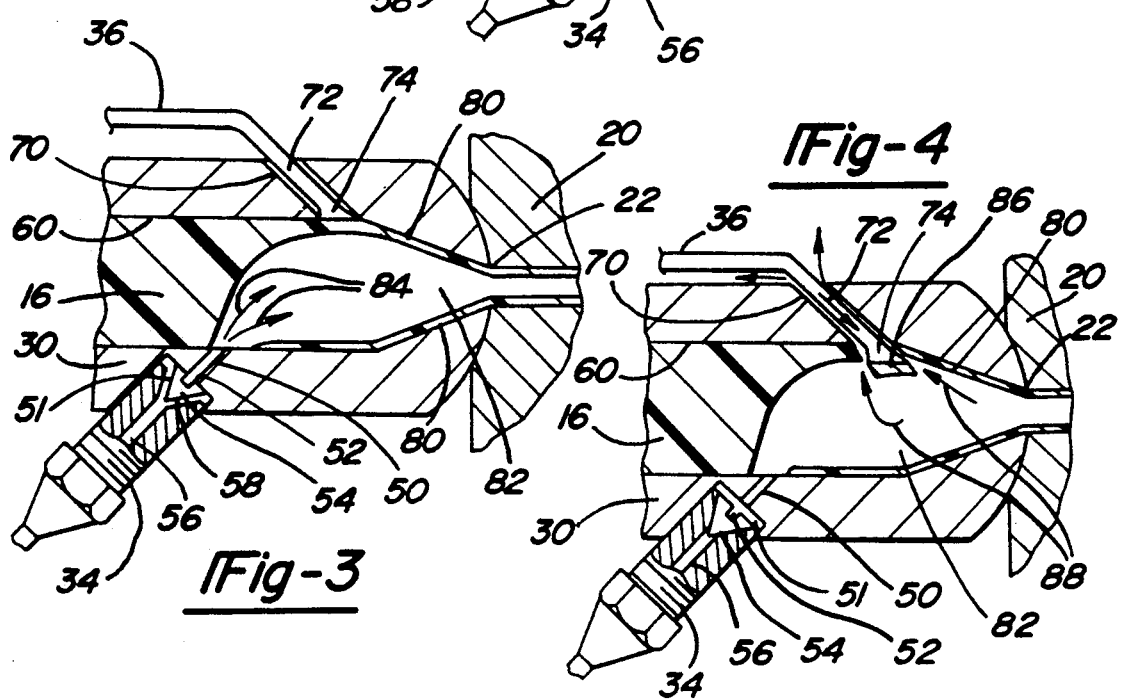

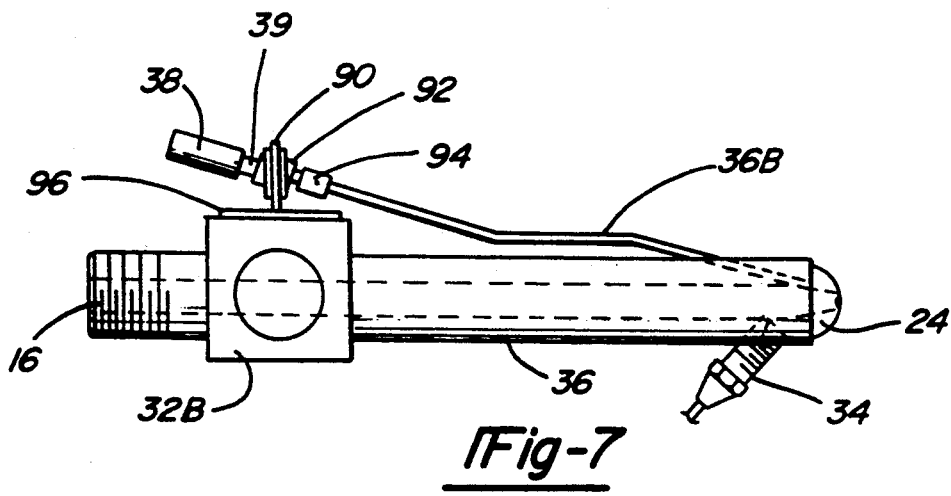
Fig-7
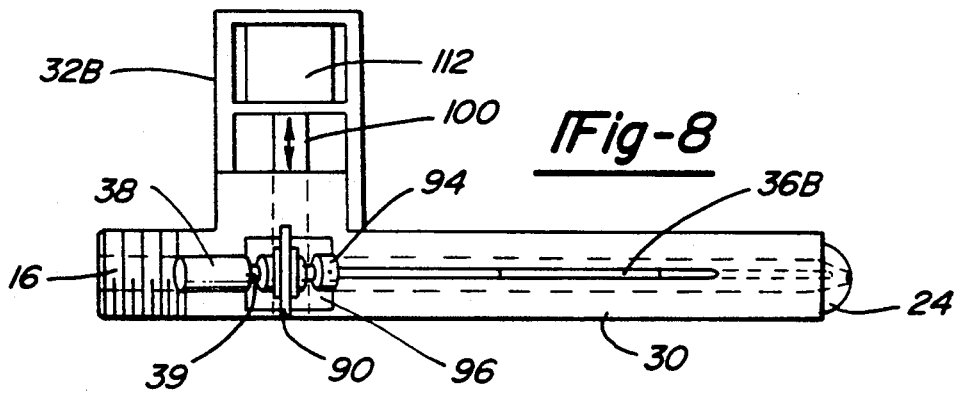
Fig-8
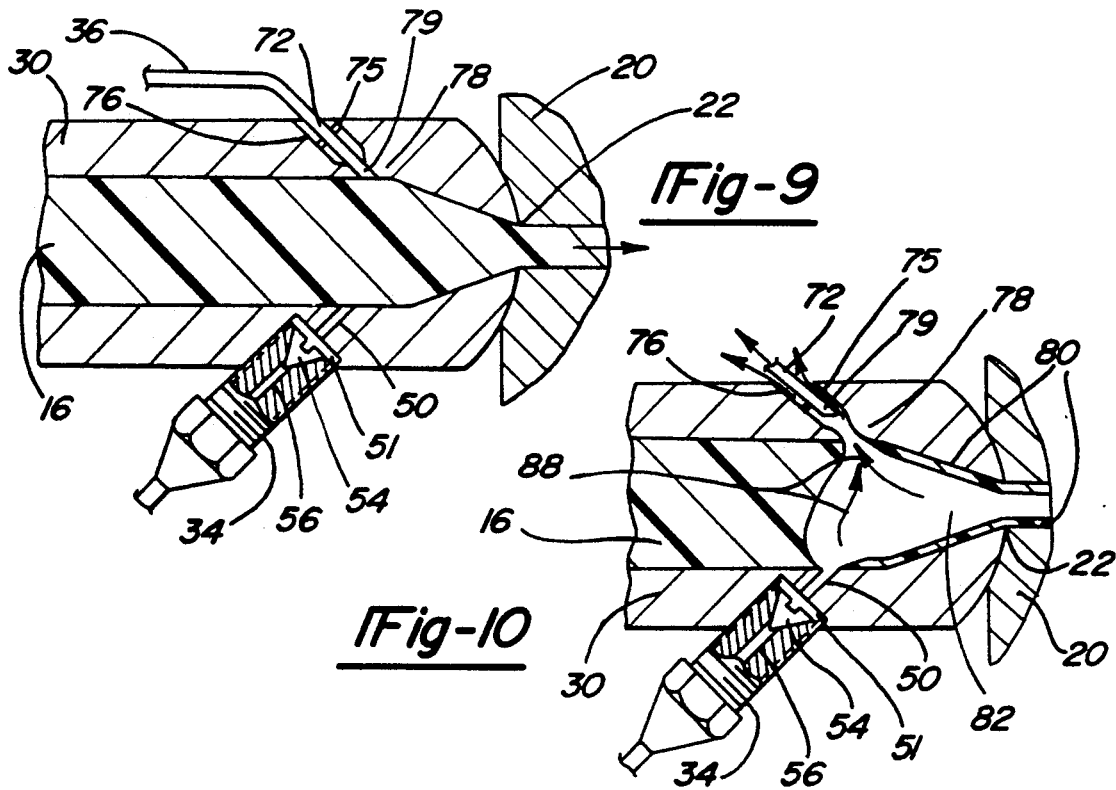
Fig-9
Fig-10

NOZZLE FOR GAS-ASSISTED INJECTION MOLDING

FIELD OF THE INVENTION

This invention relates to an improved nozzle for use in gas-assisted injection molding and a method of gas-assisted injection molding using the improved nozzle. This improved nozzle employs a very simple design to vent the gas from the mold cavity once the plastic article has cooled sufficiently to be self supporting. In one especially preferred embodiment of this invention, the improved nozzle contains a separate plastic shut-off valve, a separate gas inlet passage with a check valve, and a separate gas venting passage containing a movable pin. The improved nozzle design and method allow for almost continuous operation with minimal operator attention to the nozzle.

BACKGROUND OF THE INVENTION

Gas-assisted injection molding is generally the preferred method for the production of large and complicated parts without sink marks and the like in thick rib sections or complicated cross-sectional areas. In gas-assisted injection molding these large and complicated parts are made of a hollow construction by injecting a gas into the interior of a part while it is being formed in a mold cavity. It is known that the gas injected into the interior of the mold cavity will follow the so-called "path of least resistance." As the molten plastic cools and hardens from the outside inwardly, the gas will penetrate the inner and thicker portions of the part which are generally softer and warmer. Thus hollow cavities are generally formed in the thicker sections where, for example, structural rib and the like may be located. The pressurized gas also expands these hollow cavities thereby forcing the molten plastic outwardly to fill the mold cavity. If the gas pressure is maintained at a relatively high level while the plastic part cools, the surface finish of the plastic part will be greatly enhanced by the minimization or elimination of sink marks, depressions, or like imperfections. Such hollow cavities can also result in considerable weight savings in the finished plastic part.

It is necessary to vent the pressurized gas in the part in order to relieve the pressure within the part before the mold can be opened. Many solutions have been tried to provide a satisfactory way for introducing the gas into the interior of the plastic part and then venting the gas before opening the mold cavity. Numerous apparatuses have been advanced in the gas-assisted injection molding art to allow injection of both molten plastic and a pressurized gas with subsequent venting of the pressurized gas. Generally, these approaches involve very complicated nozzles and/or sprue bushings which have a significant tendency to fail during operation. Operation of gas-assisted injection molding systems using these prior art systems generally require significant time and resources devoted to maintenance programs.

One such apparatus for venting the gas before opening the mold cavity is described in U.S. Pat. No. 4,943,407 (Jul. 24, 1990). Generally this patent discloses a method for venting the gas to atmosphere through a specialized sprue bushing in which the sprue bushing includes a first body part in which a second body part or cylindrical part is mounted for movement upon the activation of an actuator. The part has two flowpaths which are alternately used. One flowpath allows the passage of plastic through the sprue bushing into the sprue. The second flowpath allows injection or venting of gas from the interior of the associated mold cavity. However, mold sprues are generally small, and the moving parts thereof which allow the injection of plastic and gas alternately have proven to be difficult to operate due, in significant part, to the tendency of the flowpaths to become blocked with plastic material. In addition, such specialized sprue valves add significantly to the cost of the molds.

U.S. Pat. Nos. 4,935,191 (Jun. 19, 1990), 5,015,166 (May 14, 1991), and 5,066,214 (Nov. 19, 1991) discloses a complicated design employing a plastic shut-off valve within the nozzle and gas injection and gas venting through the sprue bushing. The gas venting passageway in the sprue bushing is prone to being blocked with plastic material during the plastic injection cycle as well as during the venting cycle. And the gas injection passageway is prone to being blocked during the venting cycle. Removal of such blockages would normally require removing the sprue bushing form the mold body and cleaning out the various small diameter gas passageways.

U.S. Pat. Nos. 4,781,554 (Nov. 1, 1988), 4,905,901 (Mar. 6, 1990), and 4,944,960 (Jul. 31, 1990) disclose complicated nozzle systems wherein both resin and pressurized gas are injected through the nozzle. Two valves within the nozzle body, both of which operate with reciprocating action, allow for control of both the resin and pressurized gas flows. The valve associated with the pressurized gas is said to prevent the flow of plastic into the various gas passages. The reciprocating-type operation of these valves do not, however, allow for a positive shut-off. Once plastic material is deposited on the mating surfaces of one of reciprocating valves, that valve cannot completely seal, thereby allowing even more plastic material to be deposited thereon. Once such deposits occur, the gas passageway will quickly become blocked requiring costly downtime for cleaning. And due to the complicated design and small passages sizes, removing such blockages can be difficult.

U.S. Pat. No. 4,942,006 Jul. 17, 1990) described an even more complicated nozzle design. Within the nozzle, resin flow is controlled by a reciprocating-type valve and gas flow by a ball-shaped check valve. And U.S. Pat. No. 5,080,570 (Jan. 14, 1991) provides for a complicated nozzle wherein the plastic flow is controlled by a reciprocating-type valve and the gas flow by a reciprocating-type needle valve. Both of these complicated designs are prone to blockage and, when such blockage occurs, are difficult to clean. In addition, these nozzles—like those described above—are generally bulky due to the complicated design and the number of moving parts. Therefore, mold bodies and sprue bushings with essentially unrestricted access around the sprue opening are generally required. Thus, many of the just described nozzles cannot readily be used with existing mold or sprue bushings having relatively restrictive or limited physical access to the sprue opening.

Still more recent attempts have been made to provide simple injection nozzles that allow injection and venting of the pressurized gas through the nozzle. For example, U.S. patent application Ser. No. 07/628,746 (filed Dec. 17, 1990), which is hereby incorporated by reference, provides for a nozzle with a cylindrical barrel mounted axially within the nozzle. The barrel, which contains a separate resin passageway and a separate pressurized gas passageway, is rotatable between a first position and a second position. In the first position, resin can be injected into the mold cavity but the gas flow is blocked. In the second position, gas can be injected (and later vented) but the resin flow is blocked. U.S. patent application Ser. No. 07/714,118 (filed Jun. 12, 1991), which is hereby incorporated by reference, provides for a nozzle with a spherical valve member mounted within the resin flowpath to control both the resin and pressurized gas flows. The spherical valve member, which contains a separate resin passageway and a separate pressurized gas passageway, is rotatable between a first position and a second position. In the first position, resin can be injected into the mold cavity but the gas flow is blocked. In the second position, gas can be injected (and later vented) but the resin flow is blocked. And U.S. patent application Ser. No. 07/714,117 (filed Jun. 12, 1991), which is hereby incorporated by reference, provides a nozzle with a cylindrical valve member mounted perpendicular to the resin flowpath which can also control both the resin and gas flows. The cylindrical valve member, which contains a separate resin passageway and a separate pressurized gas passageway, is also rotatable between a first position and a second position. In the first position, resin can be injected into the mold cavity but the gas flow is blocked. In the second position, gas can be injected (and later vented) but the resin flow is blocked.

Although the nozzle designs described in patent application Ser. Nos. 07/628,746, 07/714,117, and 07/714,118 have proven to be satisfactory for many applications and are a significant improvement over prior art designs, there is still room for improvement. These nozzles still experience significant downtime unless the operator is careful during operation of the injection molding process, especially during the start up and shut down procedures, due to blockage of the various passageways with plastic material and other operational difficulties.

It is desirable, therefore, to develop an even simpler and more reliable injection nozzle for gas-assisted injection molding whereby the gas can be vented through the nozzle. Such a nozzle should allow for almost continuous operation with only minimal operator attention. And such a nozzle should be easy to clean during normal maintenance procedures or should any of the passageways eventually become blocked with plastic. The nozzle of the present invention provides just such a nozzle.

SUMMARY OF THE INVENTION

In accordance with this invention, an improved injection nozzle for gas-assisted injection molding is provided. The injection nozzle of the present invention contains a separate gas entry passageway with a check valve for injection of the gas into the molten plastic stream and a separate gas exit passageway containing a movable pin or arm for venting the gas back through the plastic passageway in the nozzle. The check valve in the gas entry passageway allows pressurized gas to be injected into the plastic material in the mold cavity but prevents gas from passing back through the gas entry passageway. The movable pin in the gas exit passageway travels from a first or closed position to a second or open position. The movable pin is normally maintained in the closed position (whereby neither pressurized gas or plastic can enter the gas exit passageway) during injection of the both the molten plastic and the pressurized gas (i.e., until it is desired to vent the pressurized gas to atmosphere). Once the plastic article has cooled sufficiently to be self supporting, the pin is moved to the open position whereby the gas is allowed to vent to atmosphere. The gas entry and gas exit passageways are located in such relationship to each other that, upon injection of the gas, a hollow cavity is formed in the plastic passageway of the nozzle so that only a relatively thin layer of plastic covers the gas exit passageway opening and the movable pin in the closed position. In the normally closed position, the end or tip of the movable pin provides support for the thin layer of plastic covering the gas exit passageway opening. In the open position, however, the support for the thin layer of plastic is effectively removed. Thus, upon moving the pin to the open position, the pressurized gas essentially bursts or punctures the thin, unsupported layer of plastic covering the gas exit passageway and then vents to atmosphere.

One object of the present invention is to provide a nozzle for use in a gas-assisted injection molding machine, said nozzle comprising:

(1) a nozzle body having an upstream end for communication with an associated injection molding machine and a downstream end for communication with an associated mold containing at least one mold cavity, said nozzle body including:
 (a) an axially extending plastic passageway for establishing a molten plastic flowpath;
 (b) a first valve chamber provided in the plastic passageway and in fluid communication therewith;
 (c) a gas entry passageway wherein the first end of the gas entry passageway intersects and communicates with the plastic passageway near the downstream end of the nozzle body, and the second end of the gas entry passageway terminates at a first location on the outer surface of the nozzle body;
 (d) a second valve chamber provided in the gas entry passageway and in fluid communication therewith; and
 (e) a gas exit passageway wherein the first end of the gas exit passageway intersects and communicates with the plastic passageway near the downstream end of the nozzle body and is in close proximity to the first end of the gas entry passageway and the second end of the gas exit passageway terminates at second location on the outer surface of the nozzle body;
wherein the first valve chamber is located between the upstream end of the nozzle body and first ends of both the gas entry passageway and the gas exit passageway;

(2) a shut-off valve mounted in the first valve chamber for movement between a first position and a second position, wherein when the shut-off valve is in the first position the molten plastic flowpath is established between the upstream end and the downstream end of the nozzle body such that molten plastic can flow through the plastic passageway into the associated mold, and when the shut-off valve is in the second position the molten plastic flowpath is blocked;

(3) a check valve mounted in the second valve chamber which allows gas to pass from the second end to the first end of the gas entry passageway and enter into the plastic passageway but prevents gas from passing from the first end to the second end of the gas entry passageway; and (4) a pin located in the gas exit passageway which is movable between a first position and a second position, wherein when the pin is in the first position gas or molten plastic in the plastic passageway cannot pass through the gas exit passageway, and when in the second position gas can pass through the gas exit passageway and thereby vent to atmosphere via the gas exit passageway.

Another object is to provide an apparatus for molding a plastic part, said apparatus comprising (1) a source of molten thermoplastic material;

(2) a source of injection gas;

(3) a mold body for receiving the molten thermoplastic material from the molten thermoplastic material source, wherein the mold body contains at least one mold cavity forming the shape of the plastic part; and (4) an injection nozzle secured between the source of thermoplastic material and the mold body, where the injection nozzle includes (a) a nozzle body having an upstream end for communication with an associated injection molding machine and a downstream end for communication with an associated mold containing at least one mold cavity, said nozzle body including:

(i) an axially extending plastic passageway for establishing a molten plastic flowpath;

(ii) a first valve chamber provided in the plastic passageway and in fluid communication therewith;

(iii) a gas entry passageway wherein the first end of the gas entry passageway intersects and communicates with the plastic passageway near the downstream end of the nozzle body and the second end of the gas entry passageway terminates at a first location on the outer surface of the nozzle body;

(iv) a second valve chamber provided in the gas entry passageway and in fluid communication therewith; and (v) a gas exit passageway wherein the first end of the gas exit passageway intersects and communicates with the plastic passageway near the downstream end of the nozzle body and is in close proximity to the first end of the gas entry passageway, and the second end of the gas exit passageway terminates at second location on the outer surface of the nozzle body;

wherein the first valve chamber is located between the upstream end of the nozzle body and first ends of both the gas entry passageway and the gas exit passageway;

(b) a shut-off valve mounted in the first valve chamber for movement between a first position and a second position, wherein when the shut-off valve is in the first position the molten plastic flowpath is established between the upstream end and the downstream end of the nozzle body such that molten plastic can flow through the plastic passageway into the associated mold, and when the shut-off valve is in the second position the molten plastic flowpath is blocked;

(c) a check valve mounted in the second valve chamber which allows gas to pass from the second end to the first end of the gas entry passageway and enter into the plastic passageway but prevents gas from passing from the first end to the second end of the gas entry passageway; and (d) a pin located in the gas exit passageway which is movable between a first position and a second position, wherein when the pin is in the first position gas or molten plastic in the plastic passageway cannot enter the gas exit passageway, and when in the second position gas can enter and pass through the gas exit passageway and thereby vent to atmosphere through the gas exit passageway.

Still another object of the present invention is to provide a nozzle for use in a gas-assisted injection molding machine, said nozzle comprising:

(1) a nozzle body having an upstream end for communication with an associated injection molding machine and a downstream end for communication with an associated mold containing at least one mold cavity, said nozzle body including:

(a) an axially extending plastic passageway for establishing a molten plastic flowpath;

(b) a gas entry passageway wherein the first end of the gas entry passageway intersects and communicates with the plastic passageway near the downstream end of the nozzle body and the second end of the gas entry passageway terminates at a first location on the outer surface of the nozzle body;

(c) a valve chamber provided in the gas entry passageway and in fluid communication therewith; and (d) a gas exit passageway wherein the first end of the gas exit passageway intersects and communicates with the plastic passageway near the downstream end of the nozzle body and is in close proximity to the first end of the gas entry passageway, and the second end of the gas exit passageway terminates at second location on the outer surface of the nozzle body;

(2) a check valve mounted in the valve chamber which allows gas to pass from the second end to the first end of the gas entry passageway and enter into the plastic passageway but prevents gas from passing from the first end to the second end of the gas entry passageway; and (3) a pin located in the gas exit passageway which is movable between a first position and a second position, wherein when the pin is in the first position gas or molten plastic in the plastic passageway cannot pass through the gas exit passageway, and when in the second position gas can enter and pass through the gas exit passageway and thereby vent from the plastic passageway to atmosphere through the gas exit passageway.

And still another object of the present invention is to provide a method for preparing a plastic article with a hollow cavity or cavities therein, said method comprising (1) employing an injection nozzle in fluid communication and located between a source of molten plastic at the upstream end of the injection nozzle and a mold body containing a mold cavity of the desired shape at the downstream end of the injection nozzle, wherein the injection nozzle includes (a) an axially extending plastic passageway for establishing a molten plastic flowpath;

(b) a first valve chamber provided in the plastic passageway and in fluid communication therewith;

(c) a gas entry passageway wherein the first end of the gas entry passageway intersects and communicates with the plastic passageway near the downstream end of the nozzle body and the second end of the gas entry passageway terminates at a first location on the outer surface of the nozzle body and is in fluid communication with a source of pressurized gas;

(d) a second valve chamber provided in the gas entry passageway and in fluid communication therewith; and (e) a gas exit passageway wherein the first end of the gas exit passageway intersects and communicates with the plastic passageway near the downstream end of the nozzle body and is in close proximity to the first end of the gas entry passageway, and the second end of the gas exit passageway terminates at second location on the outer surface of the nozzle body;

(f) a shut-off valve mounted in the first valve chamber for movement between a first position and a second position, wherein when the shut-off valve is in the first position the molten plastic flowpath is established between the upstream end and the downstream end of the nozzle body such that molten plastic can flow through the plastic passageway into the mold cavity, and when the shut-off valve is in the second position the molten plastic flowpath is blocked;

(g) a check valve mounted in the second valve chamber which allows gas to pass from the second end to the first end of the gas entry passageway and enter into the plastic passageway but prevents gas from passing from the first end to the second end of the gas entry passageway; and (h) a pin located in the gas exit passageway which is movable between a first position and a second position, wherein when the pin is in the first position gas or molten plastic in the plastic passageway cannot pass through the gas exit passageway, and when in the second position gas can enter and pass through the gas exit passageway and thereby vent from the plastic passageway to atmosphere through the gas exit passageway;

wherein the first valve chamber is located between the upstream end of the nozzle body and first ends of both the gas entry passageway and the gas exit passageway;

(2) injecting a short-shot of molten plastic through the molten plastic flowpath and into the mold cavity with the shut off valve in its first position and the pin in its first position;

(3) activating the shut-off valve to move it to its second position and terminate the injection of molten plastic;

(4) injecting pressurized gas from the source of pressurized gas into the plastic passageway through the gas entry passageway and the check valve so as to form a hollow cavity or cavities within (a) the molten plastic adjacent to the first ends of the gas entry passageway and the gas exit passageway and (b) the plastic contained within the mold cavity, whereby only a relatively thin skin of plastic covers the first end of the gas exit passageway in the injection nozzle;

(5) holding the pressurized gas within the plastic contained in the mold cavity until the plastic article has cooled sufficiently to be self supporting;

(6) moving the pin to its second position so that the pressurized gas is able to burst through the relatively thin skin of plastic covering the first end of the gas exit passageway, whereby the pressurized gas vents to atmosphere via the gas exit passageway; and (7) opening the mold cavity and removing the plastic article.

These and other objects and advantages of the present invention will become apparent through the following description of the preferred embodiments of the invention and with reference to the drawings provided.

BRIEF DESCRIPTION OF THE DRAWINGS

FIG. 1 is a perspective view of the nozzle of this invention. This figure illustrates the generally preferred relative locations of the plastic shut-off valve, the check valve located in the gas entry passageway, and the movable pin assembly.

FIG. 2 is a partial sectional view of one embodiment of the nozzle after injection of molten plastic but before the injection of pressurized gas.

FIG. 3 is a partial sectional view of the nozzle of FIG. 3 after injection of pressurized gas but before the pressurized gas is vented.

FIG. 4 is a partial sectional view of the nozzle of FIG. 3 during the venting of the pressurized gas where the pin is designed to extend into the plastic passageway.

FIG. 7 is a side view of the nozzle illustrating another embodiment of the mechanism for movement of the pin.

FIG. 8 is a top view of a nozzle employing the pin movement mechanism of FIG. 7 and a "push-pull" plastic shut-off valve. This nozzle has been rotated 90° about the axial direction from FIG. 7.

FIG. 9 is a partial sectional view of another embodiment of the nozzle after injection of molten plastic but before the injection of pressurized gas.

FIG. 10 is a partial sectional view of the nozzle of FIG. 9 during the venting of the pressurized gas where the pin is designed to retract into the gas exit passageway.

Figure 5:
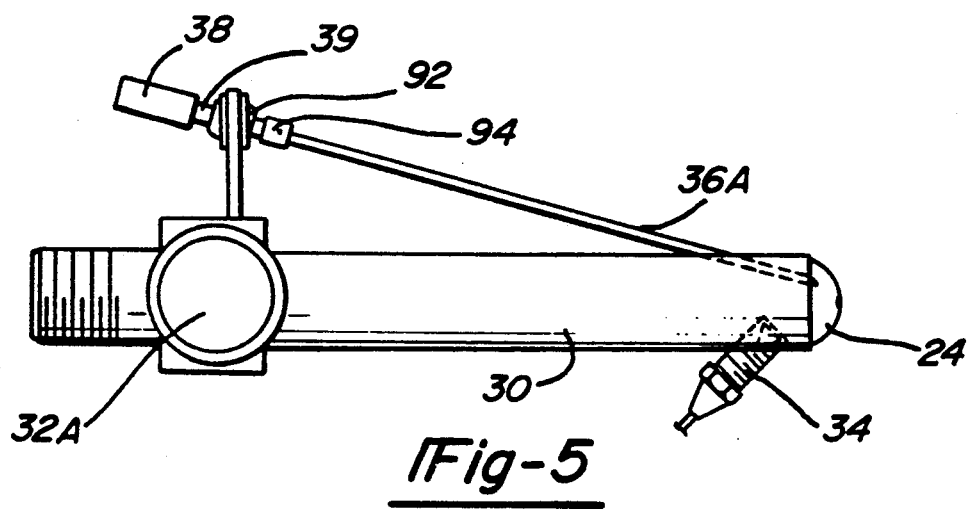
FIG. 5 is a side view of the nozzle illustrating one embodiment of the mechanism for movement of the pin.

The present invention is not to be limited to the details of construction and arrangement of parts as illustrated in the accompanying drawings as the invention is capable of other embodiments and of being practiced in various ways within the scope of the appended claims. Furthermore, the terminology used in this present specification is for the purpose of description and not of limitation.

DESCRIPTION OF THE PREFERRED EMBODIMENTS

This invention relates to an improved injection nozzle for use in gas-assisted injection molding and a method of gas-assisted injection molding using the improved injection nozzle. In one embodiment, the improved injection nozzle of the present invention contains a separate gas entry passageway with a check valve for injection of the gas into the molten plastic stream and a separate gas exit passageway containing a movable pin for venting the gas back through the plastic passageway in the nozzle and to atmosphere. In another, generally more preferred embodiment, the improved injection nozzle also contains, along with just noted check valve and movable pin, a separate resin shut-off valve. The check valve in the gas entry passageway allows pressurized gas to be injected into the plastic material in the mold cavity but prevents gas from passing back through the gas entry passageway. The movable pin in the gas exit passageway travels from a first or closed position to a second or open position. The movable pin is normally maintained in the closed position (whereby neither pressurized gas or plastic can enter the gas exit passageway) during injection of the both the molten plastic and the pressurized gas (i.e., until it is desired to vent the pressurized gas to atmosphere). Once the plastic article has cooled sufficiently to be self supporting, the pin is moved to the open position whereby the gas is allowed to vent to atmosphere. The gas entry and gas exit passageways are located in such relationship to each other that, upon injection of the gas, a hollow cavity is formed in the plastic passageway of the nozzle so that only a relatively thin layer of plastic covers the gas exit passageway opening and the movable pin in the closed position. In the normally closed position, the tip of the movable pin provides support for the thin layer of plastic covering the gas exit passageway opening. In the open position, however, the support for the thin layer of plastic is effectively removed. Thus, upon moving the pin to the open position, the pressurized gas essentially bursts or punctures the thin, unsupported layer of plastic covering the gas exit passageway and then vents to atmosphere.

The present invention will now be described in more detail in reference to the accompanying drawings. FIG. 1 generally illustrates a preferred embodiment of the injection nozzle 10 of the present invention. Nozzle 10 consists of a nozzle body 30 having one or more heating elements 42, a molten plastic passageway 16 extending axially through the nozzle body 30, and a nozzle tip 24. The molten plastic passageway 16 is formed by passageway walls 60 (FIGS. 2-4) and is in fluid communication with a source of molten resin 12 (normally an injection molding ram) at the upstream end and a mold body 20 at the downstream end. The nozzle tip 24 is designed to mate with the sprue opening 22 in the mold body 20. The mold body 20 contains one or more mold cavities (not shown) which are in fluid communication with the sprue opening 22. The nozzle 10 has a plastic shut off valve 32 for controlling the flow of plastic, a gas entry or injection port 34 for injecting pressurized gas from the pressurized gas source 14, and a movable pin 36, which passes through the nozzle body 30 near the downstream end of the nozzle 10, for venting the pressurized gas to atmosphere at the completion of an injection molding cycle. The movable pin 36 is operated by actuator 38 which is mounted on the nozzle body 30 via post or bracket 40. As can be seen in FIG. 1, the portion of the movable pin 36 passing through the nozzle body 30 and the gas entry or injection port 34 are preferably located near the downstream end of the nozzle 10. And the shut-off valve 32 is preferably located near the upstream end of the nozzle 10.

FIGS. 214 4 illustrate the operation of the improved nozzle of this invention. As shown in FIG. 2, the gas exit passageway passes through the nozzle body 30 and intersects with the molten resin passageway 16. A portion 72 of the movable pin 36 is located within the gas exit passageway 70. The end 74 of the movable pin 36 has essentially the same diameter as the gas exit passageway 70 and effectively seals off the gas exit passageway 70 from the molten resin passageway 16 when the movable pin 36 is in the first or closed position as shown in FIG. 2. The end 74 of the movable pin 36 effectively forms a portion of the molten plastic passageway 16. The check valve 51 prevents the entry of molten plastic from the molten plastic passageway 16 into the gas entry passageway 56. When molten resin is injected into the mold body, plastic resin fills the molten plastic passageway 16 as shown in FIG. 2.

After sufficient resin is injected into the mold body, pressurized gas is injected into the molten plastic via the check valve 51. This check valve allows the passage of pressurized gas in only one direction, namely into the molten plastic resin in the molten resin passageway 16. As shown in FIG. 3, taken with FIG. 1, pressurized gas passes from the injection gas source 14 into the gas passageway 56, past taper member 54, through slot 52 in taper member 54, through gas entry passageway 50, and into the molten plastic in the passageway 16 (as illustrated by arrows 84). The pressurized gas forms a cavity 82 in the resin such that only a thin layer 80 of plastic material remains in portions of the passageway 16 near the downstream end of the nozzle. The end 74 of movable pin 36 is covered by and supports a portion of the thin layer 80 of plastic material. The pressurized gas also enters into the molten plastic in the mold cavity thereby forming cavities and forcing the molten plastic outwardly to fill the cavity.

After the resin in the mold has cooled sufficiently to be self supporting, the movable pin 36 is activated so as to move the end 74 into the passageway 16. This is the second or open position of the movable pin 36 and is illustrated in FIG. 4. This movement causes the thin layer 80 of plastic material adjacent to the gas exit passageway 70 to be unsupported. The pressurized gas in cavity 82 then bursts the thin and unsupported layer 80 near the opening of the gas exit passageway 70 and vents to atmosphere through the gas exit passageway 70 (as illustrated by the arrows 88). The pressurized gas can break through the unsupported thin layer 80 in the vicinity of the end 74 because it is relatively soft and flexible. A portion 86 of the thin layer of plastic may remain on the end 74 of the movable pin 36 when the gas burst through the thin layer 80 adjacent to the gas exit passageway 70.

The movable pin 36 illustrated in FIGS. 2-4 has an end 74 which has essentially the same diameter as the gas exit passageway 70. The portion 72 of the movable pin 36 within the gas exit passageway (except for the end 74) has a smaller diameter than the gas exit passageway 70. Thus when the movable pin 36 is in the first or closed position, neither molten resin or pressurized gas can enter into the gas exit passageway 70 (as shown in FIGS. 2 and 3). When the movable pin 36 is in the second or open position (i.e., extending into the passageway 16) and the pressurized gas burst through the thin layer 80 adjacent to the gas exit passageway 70, pressurized gas can enter into and pass through the gas exit passageway 70 to atmosphere (illustrated in FIG. 4).

As one skilled in the art will realize, other configurations for the movable pin and gas exit passageway are possible. One such configuration is shown in FIGS. 9 and 10. FIG. 9 illustrates the movable pin 36 in its first or closed position and FIG. 10 in the second or open position. In this embodiment, pin 36 is retracted into the gas exit passageway 76 when the pressurized gas is to be vented. The portion 72 of pin 36 within the gas exit passageway 76 and 78 has a smaller diameter than the gas exit passageway 76 but has essentially the same diameter as the portion 78 of the gas exit passageway directly adjacent to the molten resin passageway 16. When in the closed position (FIG. 9), the end 79 of the movable pin 36 fits into and seals the gas exit passageway 78. When moved to the second or open position (FIG. 10), pressurized gas in the cavity 82 will burst or break through the thin layer 80 covering the gas exit passageway 78 and then pass through gas exit passageway 76 and 78, past movable pin portion 72, and vent to atmosphere. The movable pins in FIGS. 2–4 and FIGS. 9–10 operate in essentially the same manner except that in FIGS. 2–4 the pin is extended into the molten plastic passageway and in FIGS. 9–10 the pin is retracted into the gas exit passageway to initiate venting of the pressurized gas. Other configurations of the movable pin and gas exit passageway can also be used. As shown in FIGS. 9 and 10, a guide or guides 75 can if desired, be used to help center the pin 72 into the gas exit passageway and to help insure that the pin 72 will seat properly into the portion 78 of the gas exit passageway when the pin 72 is returned to the closed position. Such a guide 75 must, of course, allow free passage of the pressurized gas through the gas exit passageway during venting.

When the movable pin 36 is in the open position, it is generally preferred that distance between the movable pin and the gas exit passageway (70 or 76) is sufficiently large so that any pieces of plastic ejected or formed when the pressurized gas burst through the thin layer 80 of plastic covering the gas exit passageway can easily be ejected through the gas exit tube and out of the nozzle body 30 by the force of the pressurized gas venting to atmosphere. Preferably, the distance between the movable pin and the gas exit passageway is in the range of about 0.08 to 0.25 inches or, more preferably, in the range of about 0.1 to 0.17 inches. Smaller distances between the movable pin and the gas exit passageway may be used, if desired, but may required more frequent cleaning. It is generally preferred that the diameter of the gas exit passageway 70 or 76 (i.e., the non-sealing portion) is relatively large (i.e., about 0.25 inches) to allow for easy maintenance. Smaller or larger diameters can, of course, be used if desired. Preferably the gas exit passageway 70 or 76 is tapered such that smaller diameter is adjacent to the plastic passageway 16. It is generally preferred that the movable pin 36—or at least the portion within the gas exit passageway—is constructed of a material having a similar coefficient of thermal expansion to that of the nozzle body. In this way, the pin 36 should neither bind nor fit too loosely when in the closed position during the normal temperature variations (especially in the starting and shut-down periods) encountered in a typical injection molding cycle. Preferably, the pin 36—or at least the portion within the gas exit passageway—is constructed of a hard metal such as steel or, more preferably, hardened stainless steel.

The check value 34 can be of any convenient design so long as gas passes only in the desired direction (i.e., from the outside of nozzle body 30 to the passageway 16 or from the second end 56 of the gas entry passageway to the first end 50 of the gas entry passageway). Conventional ball-shaped check valves can be used if desired. More preferred, however is the tapered check valve described in copending patent application Ser. No. 07/724,044 (Jul. 1, 1991), which is hereby incorporated by reference. This preferred tapered check valve is illustrated in FIGS. 2–4 and 9–10. In this preferred check valve 34, the gas entry passageway (50 and 58) has a tapered valve chamber 51 such that the small diameter of the valve chamber 51 is adjacent to the second end of the gas entry passageway 56, the large diameter of the valve chamber 51 is adjacent to the first end of the gas entry passageway 50, and the large diameter of the valve chamber 51 is larger than the gas entry passageway 50. The check valve contains a tapered valve member 54 adapted to fit within the valve chamber 51 and movable therein between a closed position (shown in FIGS. 2, 4, 9, and 10) and an open position (shown in FIG. 3). When in the closed position, the tapered surfaces of the valve member 54 are sufficiently engaged with the tapered surfaces 58 of the valve chamber 51 to prevent gas from passing from the first end 50 of the gas entry passageway to the second end 56 of the gas entry passageway. When in the open position, the tapered surfaces of the valve member 54 are displaced from the tapered surfaces 58 of the valve chamber 51 so that gas can pass from the second end 56 to the first end 50 of the gas entry passageway and into the plastic passageway 16. As shown in FIG. 3, when the check valve 34 is in the open position, gas passes through passageway 56, around tapered member 54, through the slot 52 in the face of tapered member 54, through passageway 50, and into the resin contained in passageway 16. Preferably, the valve member 54 is cone-shaped with the taper on the valve member 54 and the tapered valve chamber 51 being in the range of 10° to 25°. Preferably, the diameter of the base of the tapered valve member 54 is in the range of 0.1 to 0.2 inches and the tapered valve member 54 is constructed of a hard metal such as steel or, more preferably, hardened stainless steel. As suggested above, additional description of the preferred check valve 34 can be found in patent application Ser. No. 07/724,044.

The resin shut-off valve 32 within the nozzle is not necessary for the operation of this invention. Resin flow can be controlled using valves located outside the nozzle if desired. The use of such a shut-off valve within the nozzle is, however, preferred. Convention shut-off valves may be used. Moreover, it is generally preferred that such a shut-off valve is located in the upstream end of the nozzle body as illustrated in FIG. 1. As one skilled in the art will realize, the shut-off valve (if used) must be upstream of the gas entry passageway 50 and the end (74 or 79) of the movable pin 36 as they intersect the plastic passageway 16. Two shut-off valves are illustrated in the drawings. FIGS. 1, 5, 6, 6A, and 6B illustrate a "push-push type" resin shut-off valve; FIGS. 7 and 8 illustrate a "push-pull type" resin shut-off valve. The shut-off valve is designed to stop or terminate the flow of resin through passageway 16, and therefore into mold body 20 which contains the mold cavity or cavities.

Figure 6:
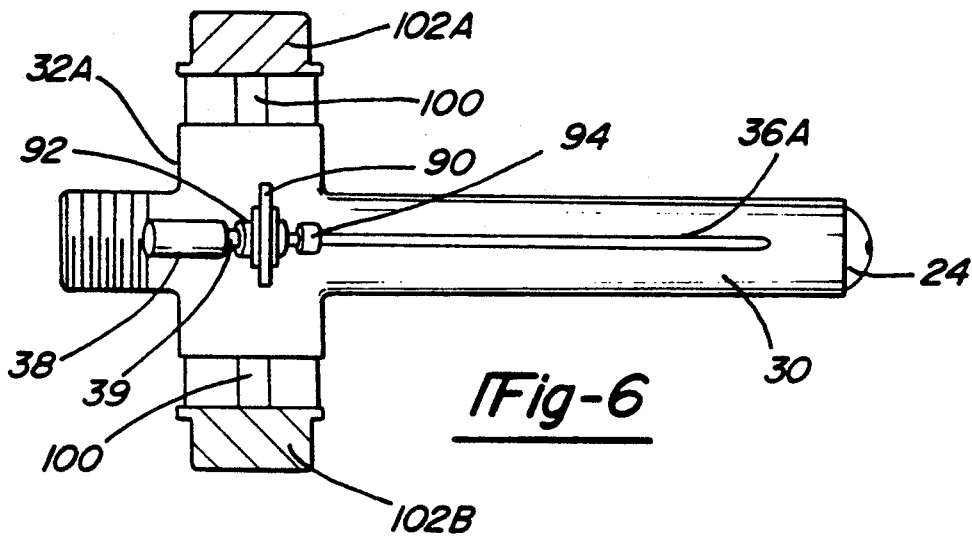
FIG. 6 is a top view of the nozzle of FIG. 5 rotated 90° about the axial direction of the nozzle.
Figure 6A:
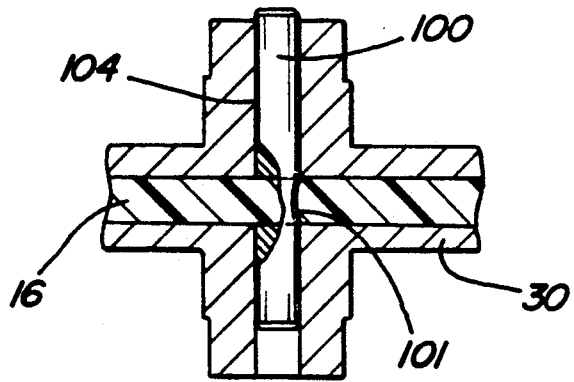
FIG. 6A is a partial sectional view of the nozzle in FIG. 6 showing the "push-push" plastic shut-off valve in the open position.
Figure 6B:
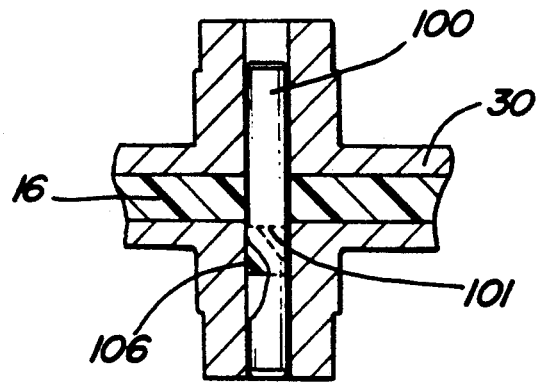
FIG. 6B is a partial sectional view of the nozzle in FIG. 6 showing the "push-push" plastic shut-off valve in the closed position.

The "push-push" valve 32A is shown in detail in FIGS. 6, 6A, and 6B. The valve 32A consists of a shaft 100 having a passageway 101 which lines up with the molten plastic passageway 16 when in the open position (FIG. 6A). The shaft 100 fits within the chamber 104 which is in fluid communication with passageway 16. At each end of the shaft 100 is an actuator (102A and 102B) to move the shaft 100 from the open to closed position. The actuators 102A and 102B may be operated by any conventional means (e.g., electrically or air driven). In operation, the passageway 101 is aligned with passageway 16 to allow molten resin to pass through the nozzle (FIG. 6A). Actuator 102A is then energized to push the shaft 100 so that passageway 101 is no longer aligned with passageway 16 to stop the flow of molten resin (FIG. 6B). In this closed position, a resin plug 106 remains within the passageway 101. With the shut-off valve in the closed position, pressurized gas may be injected into the resin, the resin allowed to cool, and the pressurized gas allowed to vent to atmosphere. After venting, actuator 102B is energized to push the shaft back into the open position as shown in FIG. 6A to ready the nozzle for the next injection molding cycle.

The "push-push" shut-off valve 32B of FIGS. 7 and 8 operates in a similar manner but employs only one actuator 112. The shaft 110 has a similar passageway (not shown) which is aligned with passageway 16 when in the open position and which is not aligned with passageway 16 when in the closed position. This actuator 112 pushes the shaft 100 to the closed position (unaligned passageways) and then, at the appropriate time, pulls the shaft 100 back to the open position (aligned passageways). The actual mode of operation is the same as shown in FIGS. 6A and 6B.

As noted above, the venting of the pressurized gas is achieved by movement of the movable pin 36. Such movement may be by extending the pin into the molten plastic passageway 16 as shown in FIG. 4 or by retracting the pin into the gas exit passageway 76 as shown in FIG. 10. The direction of movement of the pin 36 will depend on the actual configuration of the pin and the gas exit passageway. Normally a movement of about 0.1 to 0.4 inches is sufficient to open or close the gas exit passageway. Shorter or longer strokes may be necessary depending on the exact dimensions of the gas exit passageway and the portion of the pin within the gas exit passageway.

FIGS. 1, 5, and 7 illustrate mechanisms that can be used to control the movement of the movable pin 36 and, thus, regulate the opening and closing of the gas exit passageway to allow controlled venting of the pressurized gas. In FIG. 1 the movement of the pin 36 is controlled by actuator 38 which is directed connected to the pin 36 and is mounted on the nozzle body 30 by means of post 40. FIG. 5 shows the actuator 38 and its shaft 39 connected to pin 36A by means of coupling 64. The mechanism is mounted on the nozzle body 30 near the shut-off valve 32A by means of bracket 90 and adaptor 92 which is fitted in bracket 90 and through which the actuator shaft 39 passes. FIG. 7 shows a similar pin movement mechanism except that the bracket 90 is mounted on an insulating member 96 which is mounted on shut-off valve 32B. The insulating member 96 minimizes transfer of heat from the nozzle to the pin movement mechanism and is, therefore, preferably employed. The actuator 38 can be used to push the movable pin 36 forward into the open position as illustrated in FIG. 4 and then to retract the movable pin 36 back into the closed position as illustrated in FIGS. 2 and 3 after venting of the pressurized gas is completed. The actuator 38 can also be used to retract the movable pin 36 into the gas exit passageway 76 to open the gas exit passageway as illustrated in FIG. 10 and then to move the pin 36 forward to the closed position as illustrated in FIG. 9 after the venting of the pressurized gas is completed.

The portion of the movable pin 36 located between the actuator 38 and the nozzle body 30 can be modified or shaped as desired. In one embodiment, the movable pin 36 is essentially straight between the actuator 38 and the molten plastic passageway 16 (FIGS. 5 and 6). In another embodiment, the pin 36 is either bent or is composed of linked segments as shown in FIGS. 1, 7, and 8. This later embodiment (bent pin 36) may be preferred where access to the sprue opening 22 is limited since this arrangement allows for positioning the pin 36 closer to the nozzle body and closer mounting of the actuator 38 to the nozzle body 30 as can be seen in a comparison of FIGS. 5 and 7. Movement of either of these pins 36 in a back and forth manner will open and close the gas exit passageway.

As those skilled in the art will realize, other configurations of the movable pin 36 and the actuator 38 can be used. For example, the movable pin 36 could be of flexible nature. Or the actuator could be mounted at different locations on the nozzle or on the superstructure of the injection molding machine. Many other variations are possible and are within the scope of this invention.

It is generally preferred that the gas entry passageway 50 and the molten plastic passageway 16 form an acute angle with the apex of the angle being at the downstream end of the nozzle. It is also generally preferred that the gas exit passageway 70 and the molten plastic passageway 16 form an acute angle with the apex of the angle being at the downstream end of the nozzle. More preferably, these angles are in the range of about 10° to 30°. Such acute angles generally allows for easier formation of the cavity 82 (FIGS. 3 and 10) during injection of the pressurized gas. Such acute angles also allow for less obstructions at the downstream end of the nozzle.

It is also generally preferred that the intersection of the gas entry passageway 50 and the molten plastic passageway 16 and the intersection of the gas exit passageway 70 and the molten plastic passageway 16 be as close as practicable to the downstream end of the nozzle in order to minimize the amount of plastic within the nozzle that will be aerated by the pressurized gas.

The relative locations of the intersection of the gas entry passageway 50 and the molten plastic passageway 16 and the intersection of the gas exit passageway 70 and the molten plastic passageway 16 must be such that the cavity 82 (FIGS. 3, 4, and 10) is formed whereby only a thin layer 80 of plastic remains over the opening of the gas exit passageway. The actual thickness of the layer 80 over the opening is not critical so long as it is sufficiently thin so that the pressurized gas will break through or bust through the thin layer when the gas exit passageway is opened. The relative locations of the gas entry passageway and the gas exit passageway, the temperature of the resin in the thin layer 80, the thickness of the layer 80, the actual resin used, and the pressure of the pressurized gas can be varied to achieve the desired results.

Figure 11:
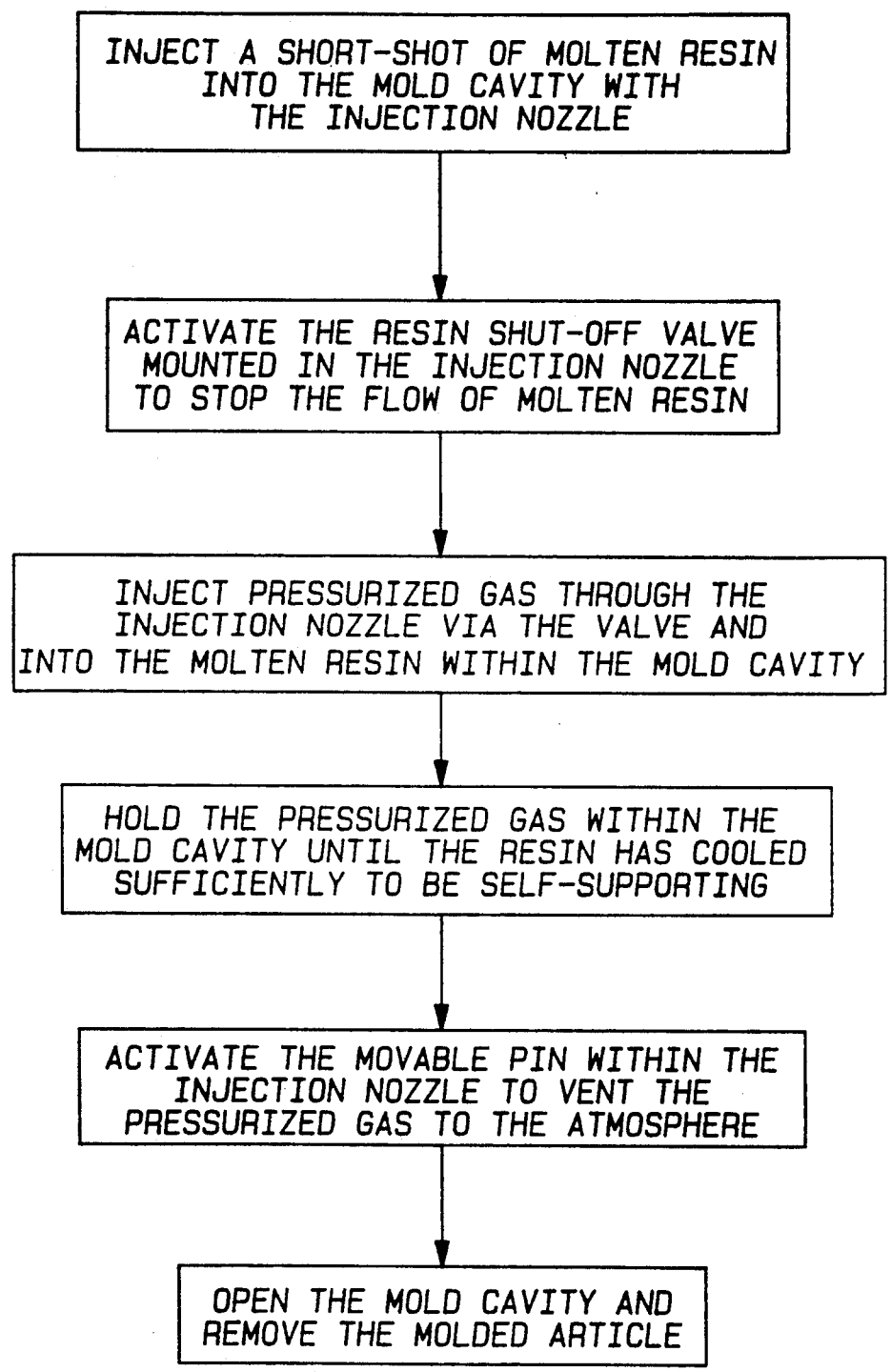
FIG. 11 is a flowchart illustrating the general gas-assisted injection molding process using a nozzle of the present invention.

FIG. 11 generally illustrates the method of gas-assisted injection molding using the improved nozzle of this invention. First a short-short of molten resin is injected into the mold cavity using the injection nozzle of this invention A short-short of resin is an amount of resin that will not fill the mold cavity and which, therefore, will allow for information of hollow areas or cavities within the resulting molded article. After injection of the desired amount of resin, the resin shut-off valve is activated to terminate the resin flow. Pressurized gas is then injected into the molten resin within the molten resin passageway in the nozzle and into the mold cavity. The injection of pressurized gas may occur immediately after the resin flow has been terminated or after a delay time. The pressurized gas is injected through a suitable check valve which allows passage of the gas into the molten resin passageway but not in the opposite direction. The molded article in the mold cavity is allowed to cool sufficiently to be self supporting while maintaining the pressure of pressurized gas within the resin. The movable pin within the gas exit passageway is then activated whereby the thin layer of resin covering the gas exit passageway is no longer supported. The pressurized gas within the nozzle barrel and mold cavity bursts through or breaks through the unsupported layer of resin and then vents to atmosphere via the gas exit passageway. The mold cavity is then opened and the molded plastic article is removed. Although not shown in FIG. 11, the cycle can be repeated by closing the mold cavity, moving the movable pin back to its closed position, and activating the resin shut-off valve to once again inject a short-shot of resin. This gas-assisted injection molding method using the improved nozzle of this invention is ideally suited for computer or process control. It can, however, by operated manually if desired.

That which is claimed is:

1. A nozzle for use in a gas-assisted injection molding machine, said nozzle comprising:
   (1) a nozzle body having an upstream end for communication with an associated injection molding machine and a downstream end for communication with an associated mold containing at least one mold cavity, said nozzle body including:
      (a) an axially extending plastic passageway for establishing a molten plastic flowpath;
      (b) a first valve chamber provided in the plastic passageway and in fluid communication therewith;
      (c) a gas entry passageway having a first end which intersects and communicates with the plastic passageway near the downstream end of the nozzle body, and a second end of said gas entry passageway terminates at a first location on the outer surface of the nozzle body;
      (d) a second valve chamber provided in the gas entry passageway and in fluid communication therewith; and
      (e) a gas exit passageway having a first end which intersects and communicates with the plastic passageway near the downstream end of the nozzle body and is in close proximity to the first end of the gas entry passageway and a second end of said gas exit passageway terminates at a second location on the outer surface of the nozzle body;
   wherein the first valve chamber is located between the upstream end of the nozzle body and first ends of both the gas entry passageway and the gas exit passageway:
   (2) A shut-off valve mounted in the first valve chamber for movement between a first position and a second position, wherein when the shut-off valve is in the first position the molten plastic flowpath is established between the upstream end and the downstream end of the nozzle body such that molten plastic can flow through the plastic passageway into the associated mold, and when the sut-off valve is in the second position the molten plastic flowpath is blocked;
   (3) a check valve mounted in the second valve chamber which allows gas to pass from the second end to the first end of the gas entry passageway and enter into the plastic passageway but prevents gas from passing from the first end to the second end of the gas entry passageway; and
   (4) a pin located in the gas exit passageway which is movable between a first position and a second position, wherein when the pin is in the first position and a second position, wherein the pin is in the first position gas and molten plastic in the plastic passageway cannot pass through the gas exit passageway, and when in the second position gas can pass through the gas exit passageway and thereby vent to atmosphere via the gas exit passageway.

2. A nozzle as defined in claim 1, wherein one end of the pin forms a portion of the molten plastic passageway when in the first position and said one end of the pin extends into the molten plastic passageway when in the second position.

3. A nozzle as defined in claim 2, wherein said one end of the pin which forms a portion of the wall of the plastic passageway has essentially the same diameter as the gas exit passageway has at an intersection point with the plastic passageway and the remainder of the pin within the gas exit passageway has a smaller diameter than the gas exit passageway so that gas can readily vent to atmosphere when the pin is in the second position.

4. A nozzle as defined in claim 1, wherein one end of the pin forms a portion of the molten plastic passageway when in the first position and said one end of the pin retracts into the gas exit passageway when in the second position.

5. A nozzle as defined in claim 4, wherein the portion of the pin within the gas exit passageway has essentially the same diameter as the gas exit passageway has at an intersection point with the plastic passageway and the gas exit passageway removed from the plastic passageway has a larger diameter than the portion of the pin within the gas exit passageway so that gas can readily vent to atmosphere when the pin is in the second position.

6. A nozzle as defined in claim 2, wherein a first angle is formed by the upstream end of the nozzle body, the first end of the gas entry passageway, and the second end of the gas entry passageway and a second angle is formed by the upstream end of the nozzle body, the first end of the gas exit passageway, and the second end of the gas exit passageway said angles being acute angles where the first end of the gas entry passageway forms the apex of the first angle and the first end of the gas exit passageway forms the apex of the second angle.

7. A nozzle as defined in claim 4, wherein a first angle is formed by the upstream end of the nozzle body, the first end of the gas entry passageway, and the second end of the gas entry passageway and a second angle is formed by the upstream end of the nozzle body, the first end of the gas exit passageway, and the second end of the gas exit passageway, said angles being acute angles where the first end of the gas entry passageway forms the apex of the first angle and the first end of the gas exit passageway forms the apex of the second angle.

8. A nozzle as defined in claim 6, wherein the first angle and the second angle are in the range of about 10° to 30°.

9. A nozzle as defined in claim 7, wherein the first angle and the second angle are in the range of about 10° to 30°.

10. A nozzle as defined in claim 1, wherein the second valve chamber is spherically shaped and the check valve is a ball check valve.

11. A nozzle as defined in claim 1, wherein the second valve chamber is tapered and having a small diameter adjacent to the second end of the gas entry passageway, and a large diameter adjacent to the first end of the gas entry passageway, and said large diameter of said second valve chamber is larger than the gas entry passageway and the check valve consists of a tapered valve member adapted to fit within said second valve chamber and movable therein between a closed position and an open position, wherein
  (1) when the tapered valve member is in the closed position, the tapered surfaces of the valve member are sufficiently engaged with the tapered surfaces of said second valve chamber to prevent gas from passing from the first end of the gas entry passageway to the second end of the gas entry passageway, and
  (2) when the tapered valve member is in the opened position, the tapered surfaces of the valve member are displaced from the tapered surfaces of said second valve chamber whereby gas can pass from the second end to the first end of the gas entry passageway and into the plastic passageway.

12. A nozzle as defined in claim 11, wherein the tapered valve member is cone-shaped, the taper on the tapered valve member is in the range of 10° to 25°, the diameter of the base of the tapered valve member is in the range of 0.1 to 0.2 inches, and the tapered valve member is constructed of a hard metal.

13. An apparatus for molding a plastic part, said apparatus comprising
  (1) a source of molten thermoplastic material;
  (2) a source of injection gas;
  (3) a mold body for receiving the molten thermoplastic material from the molten thermoplastic material source, wherein the mold body contains at least one mold cavity forming the shape of the plastic part; and
  (4) an injection nozzle secured between the source of thermoplastic material and the mold body, where the injection nozzle includes
    (a) a nozzle body having an upstream end for communication with an associated injection molding machine and a downstream end for communication with an associated mold containing at least one mold cavity, said nozzle body including:
      (i) an axially extending plastic passageway for establishing a molten plastic flowpath;
      (ii) a first valve chamber provided in the plastic passageway and in fluid communication therewith;
      (iii) a gas entry passageway having a first end which intersects and communicates with the plastic passageway near the downstream end of the nozzle body and a second end of the gas entry passageway terminates at a first location on the outer surface of the nozzle body;
      (iv) a second valve chamber provided in the gas entry passageway and in fluid communication therewith; and
      (v) a gas exit passageway wherein the first end of the gas exit passageway intersects and communicates with the plastic passageway near the downstream end of the nozzle body and is in close proximity to the first end of the gas entry passageway, and the second end of the gas exit passageway terminates at second location on the outer surface of the nozzle body;
    wherein the first valve chamber is located between the upstream end of the nozzle body and first ends of both the gas entry passageway and the gas exit passageway;
    (b) a shut-off valve mounted in the first valve chamber for movement between a first position and a second position, wherein when the shut-off valve is in the first position the molten plastic flowpath is established between the upstream end and the downstream end of the nozzle body such that molten plastic can flow through the plastic passageway into the associated mold, and when the shut-off valve is in the second position the molten plastic flowpath is blocked;
    (c) a check valve mounted in the second valve chamber which allows gas to pass from the second end to the first end of the gas entry passageway and enter into the plastic passageway but prevents gas from passing from the first end to the second end of the gas entry passageway; and
    (d) a pin located in the gas exit passageway which is movable between a first position and a second position, wherein when the pin is in the first position gas and molten plastic in the plastic passageway cannot enter the gas exit passageway, and when in the second position gas can enter and pass through the gas exit passageway and thereby vent to atmosphere through the gas passageway.

14. An apparatus as defined in claim 13, wherein one end of the pin forms a portion of the molten plastic passageway when in the first position and said one end of the pin extends into the molten plastic passageway when in the second position, and wherein a first angle is formed by the upstream end of the nozzle body, the first end of the gas entry passageway, and a second end of the gas entry passageway and a second angle is formed by the upstream end of the nozzle body, the first end of the gas exit passageway, and the second end of the gas exit passageway, said angles being acute angles where the first end of the gas entry passageway forms the apex of the first angle and the first end of the gas exit passageway forms the apex of the second angle.

15. An apparatus as defined in claim 14, wherein said one end of the pin which forms a portion of the wall of the plastic passageway has essentially the same diameter as the gas exit passageway has at an intersection point with the plastic passageway and the remainder of the pin within the gas exit passageway has a smaller diameter than the gas exit passageway so that gas can readily vent to atmosphere when the pin is in the second position.

16. An apparatus as defined in claim 13, wherein one end of the pin forms a portion of the molten plastic passageway when in the first position and said one end of the pin retracts into the gas exit passageway when in the second position, and wherein a first angle is formed by the upstream end of the nozzle body, the first end of the gas entry passageway, and the second end of the gas entry passageway and a second angle is formed by the upstream end of the nozzle body, the first end of the gas exit passageway, and the second end of the gas exit passageway, said angles being acute angles where the first end of the gas entry passageway forms the apex of the first angle and the first end of the gas exit passageway forms the apex of the second angle.

17. An apparatus as defined in claim 16, wherein the portion of the pin within the gas exit passageway has essentially the same diameter as the gas exit passageway has at an intersection point with the plastic passageway and the gas exit passageway removed from the plastic passageway has a larger diameter than the portion of the pin within the gas exit passageway so that gas can readily vent to atmosphere when the pin is in the second position.

18. An apparatus defined in claim 13, wherein the second valve chamber is tapered and having a small diameter adjacent to the second end of the gas entry passageway, and a large diameter adjacent to the first end of the gas entry passageway, and said large diameter of said second valve chamber is larger than the gas entry passageway and the check valve consists of a tapered valve member adapted to fit within said second valve chamber and movable therein between a closed position and an open position, wherein (1) when the tapered valve member is in the closed position, the tapered surfaces of said second valve member are sufficiently engaged with the tapered surfaces of the valve chamber to prevent gas from passing from the first end of the gas entry passageway to the second end of the gas entry passageway, and (2) when the tapered valve member is in the opened position, the tapered surfaces of the valve member are displaced from the tapered surface of said second valve chamber whereby gas can pass from the second end to the first end of the gas entry passageway and into the plastic passageway.

19. An apparatus as defined in claim 18, wherein the tapered valve member is cone-shaped, the taper on the tapered valve member is in the range of 10° to 25°, the diameter of the base of the tapered valve member is in the range of 0.1 to 0.2 inches, and the tapered valve member is constructed of a hard metal.

20. A nozzle for use in a gas-assisted injection molding machine, said nozzle comprising:

(1) a nozzle body having an upstream end for communication with an associated injection molding machine and a downstream end for communication with an associated mold containing at least one mold cavity, said nozzle body including:

(a) an axially extending plastic passageway for establishing a molten plastic flowpath;

(b) a gas entry passageway having a first end which intersects and communicates with the plastic passageway near the downstream end of the nozzle body and a second end which terminates at a first location on the outer surface of the nozzle body;

(c) a valve chamber provided in the gas entry passageway and in fluid communication therewith; and (d) a gas exit passageway having a first end which intersects and communicates with the plastic passageway near the downstream end of the nozzle body and is in close proximity to the first end of the gas entry passageway, and a second end of said gas exit passageway terminates at a second location on the outer surface of the nozzle body;

(2) a check valve mounted in the valve chamber which allows gas to pass from the second end to the first end of the gas entry passageway and enter into the plastic passageway but prevents gas from passing from the first end to the second end of the gas entry passageway; and (3) a pin located in the gas exit passageway which is movable between a first position and a second position, wherein when the pin is in the first position gas or molten plastic in the plastic passageway cannot pass through the gas exit passageway, and when in the second position gas can enter and pass through the gas exit passageway and thereby vent from the plastic passageway to atmosphere through the gas exit passageway.

21. A nozzle as defined in claim 20, wherein one end of the pin forms a portion of the molten plastic passageway when in the first position and said one end of the pin extends into the molten plastic passageway when in the second position, and wherein a first angle is formed by the upstream end of the nozzle body, the first end of the gas entry passageway, and the second end of the gas entry passageway and a second angle is formed by the upstream end of the nozzle body, the first end of the gas exit passageway, and the second end of the gas exit passageway, said angles being acute angles where the first end of the gas entry passageway forms the apex of the first angle and the first end of the gas exit passageway forms the apex of the second angle.

22. A nozzle as defined in claim 21, wherein said one end of the pin which forms a portion of the wall of the plastic passageway has essentially the same diameter as the gas exit passageway has at an intersection point with the plastic passageway and the remainder of the pin within the gas exit passageway has a smaller diameter than the gas exit passageway so that gas can readily vent to atmosphere when the pin is in the second position.

23. A nozzle as defined in claim 20, wherein one end of the pin forms a portion of the molten plastic passageway when in the first position and said one end of the pin retracts into the gas exit passageway when in the second position, and wherein a first angle is formed by the upstream end of the nozzle body, the first end of the gas entry passageway, and the second end of the gas entry passageway and a second angle is formed by the upstream end of the nozzle body, the first end of the gas exit passageway, and the second end of the gas exit passageway, said angles being acute angles there the first end of the gas entry passageway forms the apex of the first angle and the first end of the gas exit passageway forms the apex of the second angle.

24. A nozzle as defined in claim 23, wherein the portion of the pin within the gas exit passageway has essentially the same diameter as the gas exit passageway has at an intersection point with the plastic passageway and the gas exit passageway removed from the plastic passageway has a larger diameter than the portion of the pin within the gas exit passageway so that gas can readily vent to atmosphere when the pin is in the second position.

25. A nozzle defined in claim 20, wherein the valve chamber is tapered having a small diameter adjacent to the second end of the gas entry passageway, and a large diameter adjacent to the first end of the gas entry passageway, and said large diameter of said second valve chamber is larger than the gas entry passageway and the check valve consists of a tapered valve member adapted to fit within said second valve chamber and movable therein between a closed position and an open position, wherein (1) when the tapered valve member is in the closed position, the tapered surfaces of the valve member are sufficiently engaged with the tapered surface if said second valve chamber to prevent gas from passing from the first end of the gas entry passageway to the second end of the gas entry passageway, and (2) when the tapered valve member is in the opened position, the tapered surfaces of the valve member are displaced from the tapered surfaces of said second valve chamber whereby gas can pass from the second end to the first end of the gas entry passageway and into the plastic passageway.

* * * * *

UNITED STATES PATENT AND TRADEMARK OFFICE
CERTIFICATE OF CORRECTION

PATENT NO.   : 5,273,417
DATED        : December 28, 1993
INVENTOR(S)  : Nelson, William A.

It is certified that error appears in the above-indentified patent and that said Letters Patent is hereby corrected as shown below:

Claim 1, column 16, lines 7 and 8 of the patent, delete
   "wherein when the pin is in the first position and a second position"

Claim 23, column 20, line 46 of the patent, after angles
   delete "there" and insert --where--

Signed and Sealed this

Seventeenth Day of May, 1994

Attest:

BRUCE LEHMAN

Attesting Officer          Commissioner of Patents and Trademarks